219-121 SR T.T.

3/27/79 OR 4,146,773

United States Patent [19]

Willems et al.

[11] 4,146,773

[45] Mar. 27, 1979

[54] WELDING TORCH FOR PLASMA-MIG-WELDING

[75] Inventors: Gerardus A. M. Willems; Gerrit W. Tichelaar, both of Eindhoven, Netherlands

[73] Assignee: U.S. Philips Corporation, New York, N.Y.

[21] Appl. No.: 778,601

[22] Filed: Mar. 17, 1977

[30] Foreign Application Priority Data

Mar. 31, 1976 [NL] Netherlands ........................ 7603317

[51] Int. Cl.[2] ................................................ B23K 9/00

[52] U.S. Cl. .................................. 219/121 P; 219/75; 219/76.16

[58] Field of Search ................. 219/121 P, 121 R, 74, 219/76, 75, 130, 136; 313/231.3

[56] References Cited

U.S. PATENT DOCUMENTS

| | | | |
|---|---|---|---|
| 2,806,124 | 9/1957 | GaGe | 219/121 P |
| 2,903,559 | 9/1959 | Wempe | 219/74 X |
| 2,982,845 | 5/1961 | Yenni et al. | 219/74 X |
| 3,197,605 | 7/1965 | Sunnen | 219/75 X |
| 3,312,566 | 4/1967 | Winzeler et al. | 219/121 P |
| 3,818,175 | 6/1974 | Essers et al. | 219/121 P |

FOREIGN PATENT DOCUMENTS

| | | | |
|---|---|---|---|
| 1901349 | 7/1970 | Fed. Rep. of Germany | 219/121 P |
| 925089 | 5/1063 | United Kingdom | 219/121 P |
| 1439575 | 6/1976 | United Kingdom | 219/121 P |

OTHER PUBLICATIONS

Plasma Mig Welding, 12-1974, Welding and Metal Fabrication.

*Primary Examiner*—J. V. Truhe
*Assistant Examiner*—M. Paschall
*Attorney, Agent, or Firm*—William J. Streeter; Rolf E. Schneider

[57] ABSTRACT

A compact plasma-MIG welding torch in which the non-consumable electrode and the contact tube for the consumable electrode are accommodated in separate passages in the housing whereby the distance between the non-consumable electrode and the contact tube becomes comparatively small, the distance between the contact tube and the nozzle is short, and the extension of the consumable electrode is small during welding.

2 Claims, 3 Drawing Figures

WELDING TORCH FOR PLASMA-MIG-WELDING

This invention relates to a welding torch for plasma-MIG-welding, comprising a housing with a non-consumable electrode and a contact tube, the said housing furthermore comprising a nozzle with a plasma aperture and a connection for the supply of a plasma gas. The invention also relates to a housing for said welding torch.

The non-consumable electrode and the contact tube of a welding torch of this kind, which is known from U.S. Pat. No. 3,891,824 are arranged in a common chamber as near as possible to each other in order to minimize the lateral dimensions of the welding torch. This known torch construction has a drawback in that the distance between the contact tube through which the welding wire is passed, on the one hand and the plasma aperture and the non-consumable electrode on the other hand must remain comparatively large in order to prevent overheating of the contact tube by radiation from the non-consumable electrode. Furthermore, due to the comparatively large distance between the contact tube and the plasma aperture, the minimum extension of the welding wire is also comparatively large. The wire extension is to be understood to mean the distance between the contact tube and the free end of the welding wire. It has been found that, in the case of positive polarity of the non-consumable electrode and of the welding wire, the transition current intensity at which rotation of the MIG-arc occurs, as described in U.S. Pat. No. 3,891,824 decreases as the wire extension increases. For given applications, however, a higher transition current intensity and hence a shorter wire extension are desirable.

Moreover, in spite of the comparatively large distance between the non-consumable electrode and the contact tube, the possibility of high-frequency flash-over between the non-consumable electrode and the contact tube when the plasma arc is struck continues to exist; in practice this often causes damage to the non-consumable electrode as well as to the contact tube.

The invention has for its object to provide a welding torch for plasma-MIG-welding which at least mitigates these drawbacks. To this end, a welding torch in accordance with the invention is characterized in that the non-consumable electrode and the contact tube are arranged in separate passages in the housing, the said passages being separated by a partition. Thanks to the presence of the partition, the distance between the non-consumable electrode and the contact tube and the distance between the contact tube and the plasma aperture, and hence the extension of the welding wire, can be reduced, the partition shielding the contact tube against thermal radiation from the non-consumable electrode. Preferably, the housing is provided with a cavity, adjacent the partition, by means of which the partition may be cooled.

In a preferred embodiment of the welding torch in accordance with the invention, the housing consists of a single piece of copper. As a result of this step, a simple torch construction is obtained; high-frequency discharging between the non-consumable electrode and the contact tube can be prevented in a simple manner by earthing the partition via a capacitor. For the cooling of the entire torch it is sufficient to cool merely the copper housing, preferably at least in the region of the partition.

In a further preferred embodiment of the welding torch in accordance with the invention, the nozzle is also formed in the said piece of copper. Thus, a very compact torch construction is obtained in which the housing and the nozzle form a homogeneous integral unit. Thanks to the favourable heat conduction properties of the copper, moreover, separate cooling of the nozzle can be dispensed with.

According to another aspect of the invention, there is provided a housing for a plasma-MIG-welding torch, the housing having a first passage therethrough for accommodating a non-consumable electrode, a second, separate passage therethrough for accommodating at least an end portion of a contact tube, the two passages being separated by a partition, and a cavity in the housing adjacent the partition, whereby the partition may be cooled.

Embodiments of the invention will now be described in detail with reference to the accompanying drawings, of which:

Figure 1:
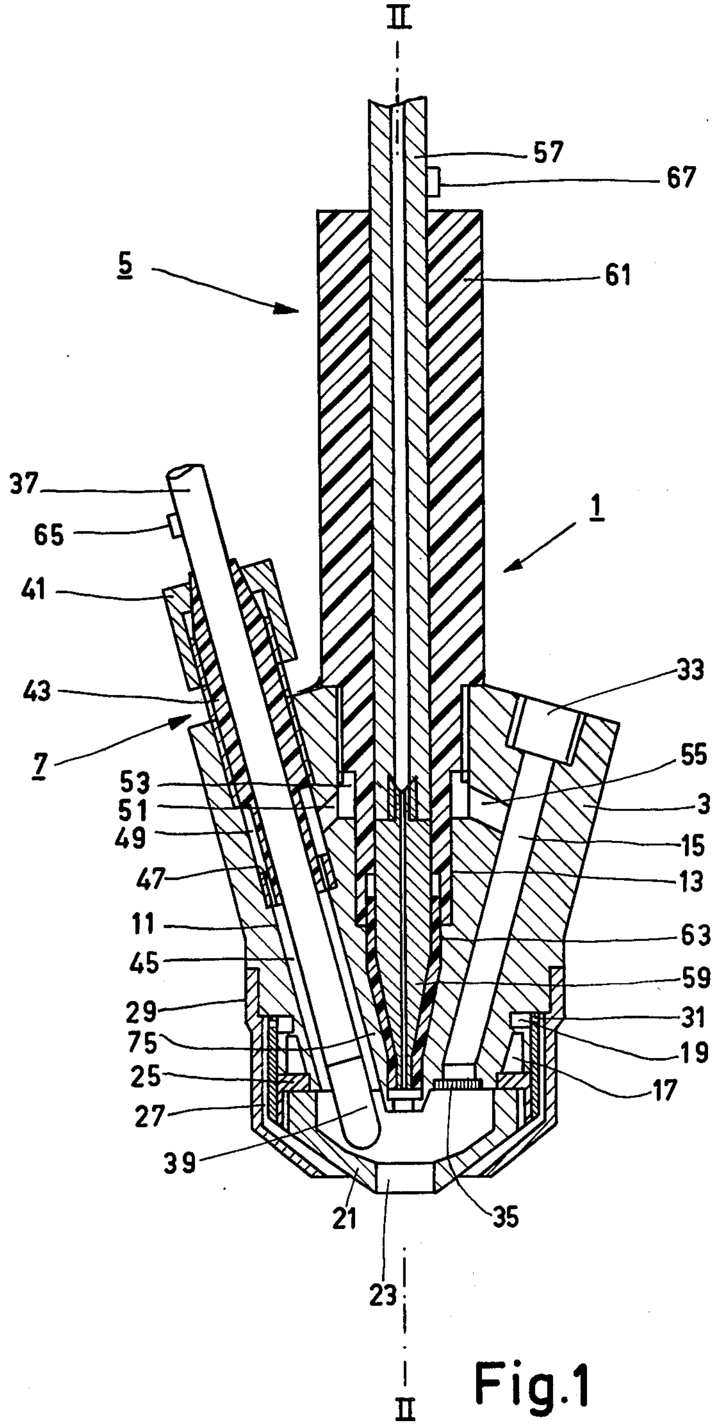
FIG. 1 is a longitudinal sectional view of an embodiment of a welding torch in accordance with the invention.

The welding torch 1 shown in FIG. 1 comprises a housing 3, a wire guide 5 and a non-consumable electrode 7. The housing 3 has a substantially rotation-symmetrical construction and is made of a single piece of copper in which are formed a chamber 11, a central cavity 13, a duct 15, an annular cooling chamber 17 and an annular duct 19 for a shielding gas. A copper nozzle 21 provided with a plasma aperture 23 is mounted on the housing 3. The cooling chamber 17 is closed by a sealing ring 25 which is arranged between the nozzle and the housing. An annular gap 27 between the inner circumference of a cover 29 and the outer circumference of the housing and the nozzle communicates with the annular duct 19 via openings 31. The duct 15 serves for the supply of an inert plasma gas, for example argon, via a connection 33 and a gas diffuser 35, to the nozzle 21.

The non-consumable electrode 7 consists of a copper holder 37 and a tungsten electrode 39 which is to be loaded by the plasma arc. The holder 37 is clamped, by way of a coupling nut 41, in a sleeve 43 of an electrically insulating material which is secured in the chamber 11 so that an annular duct 45 is formed in this chamber. Via bores 47 in the sleeve 43 and ducts 49, 51, 53 and 55, this duct 45 communicates with the duct 15 which serves for the supply of the plasma gas.

The wire guide 5 consists of a guide tube 57 and a contact tube 59 which are secured in the central cavity 13 of the housing by a holder 61 of an electrically-insulating material. The contact tube 59 itself is insulated with respect to the housing by means of a sleeve 63 of a synthetic material. The holder 37 of the non-consumable electrode and the guide tube 57 are provided with connection terminals 65 and 67, respectively, for connection to power supply sources not shown.

Figure 2:
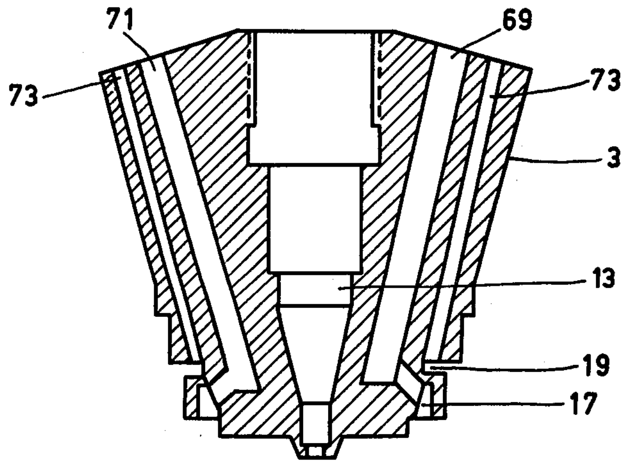
FIG. 2 is a longitudinal sectional view of the housing of the welding torch taken along the line II—II of FIG. 1.

As shown in FIG. 2, the annular cooling chamber 17 communicates with ducts 69 and 71 for the supply and discharge of cooling water. The annular duct 19 communicates with supply ducts 73 for the supply of a shielding gas.

The welding torch 1 in accordance with the invention is distinctly characterized by the cooper partition 75 which forms a separation between the chamber 11 in which the non-consumable electrode 7 is arranged and the cavity 13 in which the contact tube 59 is accommodated. The principle of the plasma-MIG-welding process is known, inter alia from the above-mentioned Patent and need not be elaborated herein.

Figure 3:
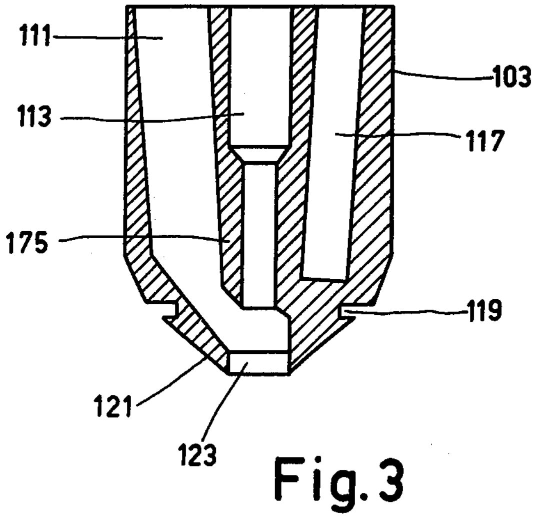
FIG. 3 is a longitudinal sectional view of the housing of a further embodiment of the welding torch.

FIG. 3 shows the housing of a further embodiment of the welding torch in accordance with the invention. The housing 103 of this welding torch can be constructed to be very simple and compact, because the housing as well as the nozzle 121 are made of one and the same piece of copper and form an homogeneous integral unit. The housing in this embodiment comprises a chamber 111 in which a non-consumable electrode is to be arranged and which also serves for the supply of a plasma gas and communicates with the plasma aperture 123, and a central cavity 113 which accommodates a contact tube. In view of the small dimensions of the housing, the cooling requirements can be satisfied by way of a bore 117 which serves as a cooling chamber. An annular duct 119 serves for the distribution of a shielding gas which is applied to the annular duct 119 in a manner similar to the manner used for the already described embodiment. The chamber 111 for the non-consumable electrode and the central cavity 113 for the contact tube are again separated by a copper partition 175 in this embodiment. The non-consumable electrode and the contact tube can be secured in the housing in the same manner as in the first embodiment or in another, conventional manner.

What is claimed is:

1. A plasma-MIG welding torch, which comprises a metallic housing provided with a nozzle; a first passage extending through and axially disposed within said housing and terminating short of said nozzle; a contact tube positioned lengthwise in said axial passage and electrically insulated from said housing, said contact tube extending over the entire length of said axial passage and serving to continuously direct a consumable electrode toward and into said nozzle; means associated with said contact tube to supply power thereto and to the consumable electrode; a second passage extending through said housing and eccentrically disposed within said housing with respect to said axial passage and also terminating short of said nozzle; a non-consumable electrode mounted lengthwise in said second passage and extending through the entire length of the same and also electrically insulated from said housing, the inner end of said non-consumable electrode being adjacent the nozzle end of said contact tube; separate means associated with said non-consumable electrode to supply power thereto; a metallic partition included in said housing and separating said second passage from said first passage over their entire lengths; and a further passage in said housing for flowing a plasma gas through said nozzle.

2. A welding torch according to claim 1, in which the housing includes a cooling cavity adjacent the nozzle ends of said contact tube and said non-consumable electrode.

* * * * *